March 20, 1962  J. R. JOHNSON ETAL  3,025,786
DEVICE FOR MARKING CONTAINERS
Filed Oct. 26, 1959  2 Sheets-Sheet 1
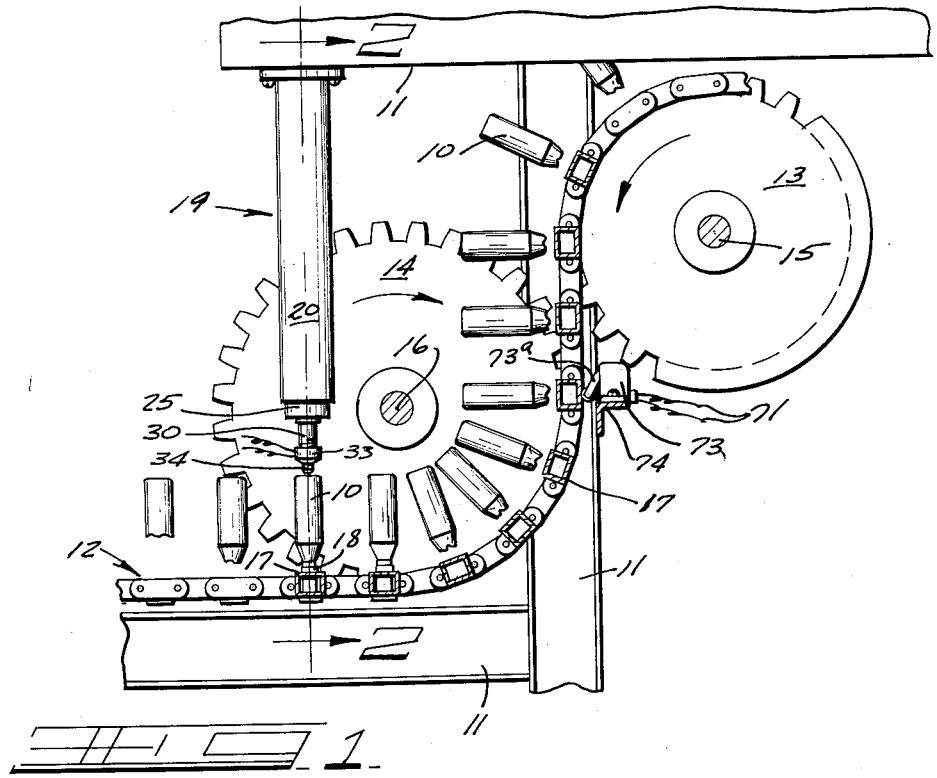
FIG. 1
FIG. 4
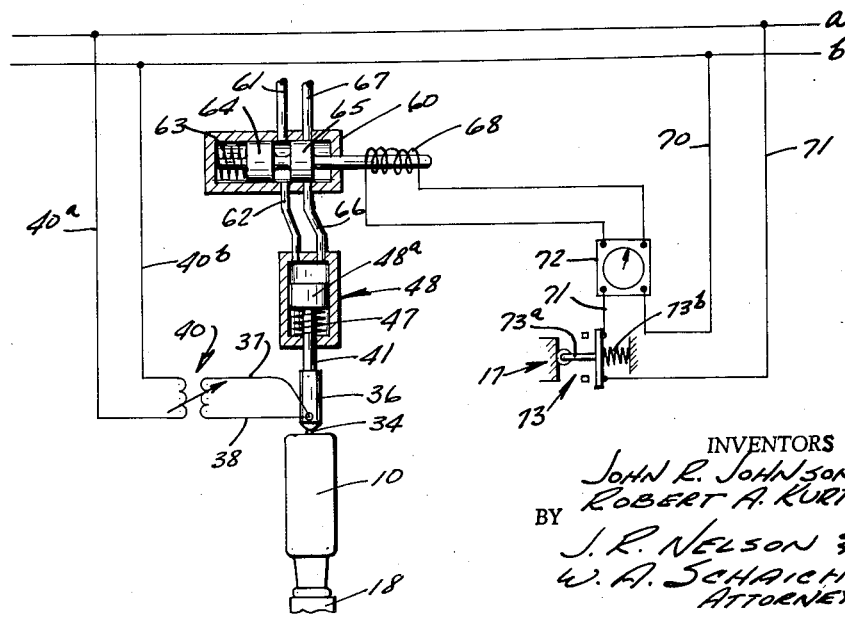
INVENTORS
JOHN R. JOHNSON
ROBERT A. KURTZ
BY J. R. NELSON &
W. A. SCHAICH
ATTORNEYS March 20, 1962　　J. R. JOHNSON ETAL　　3,025,786
DEVICE FOR MARKING CONTAINERS
Filed Oct. 26, 1959　　2 Sheets-Sheet 2
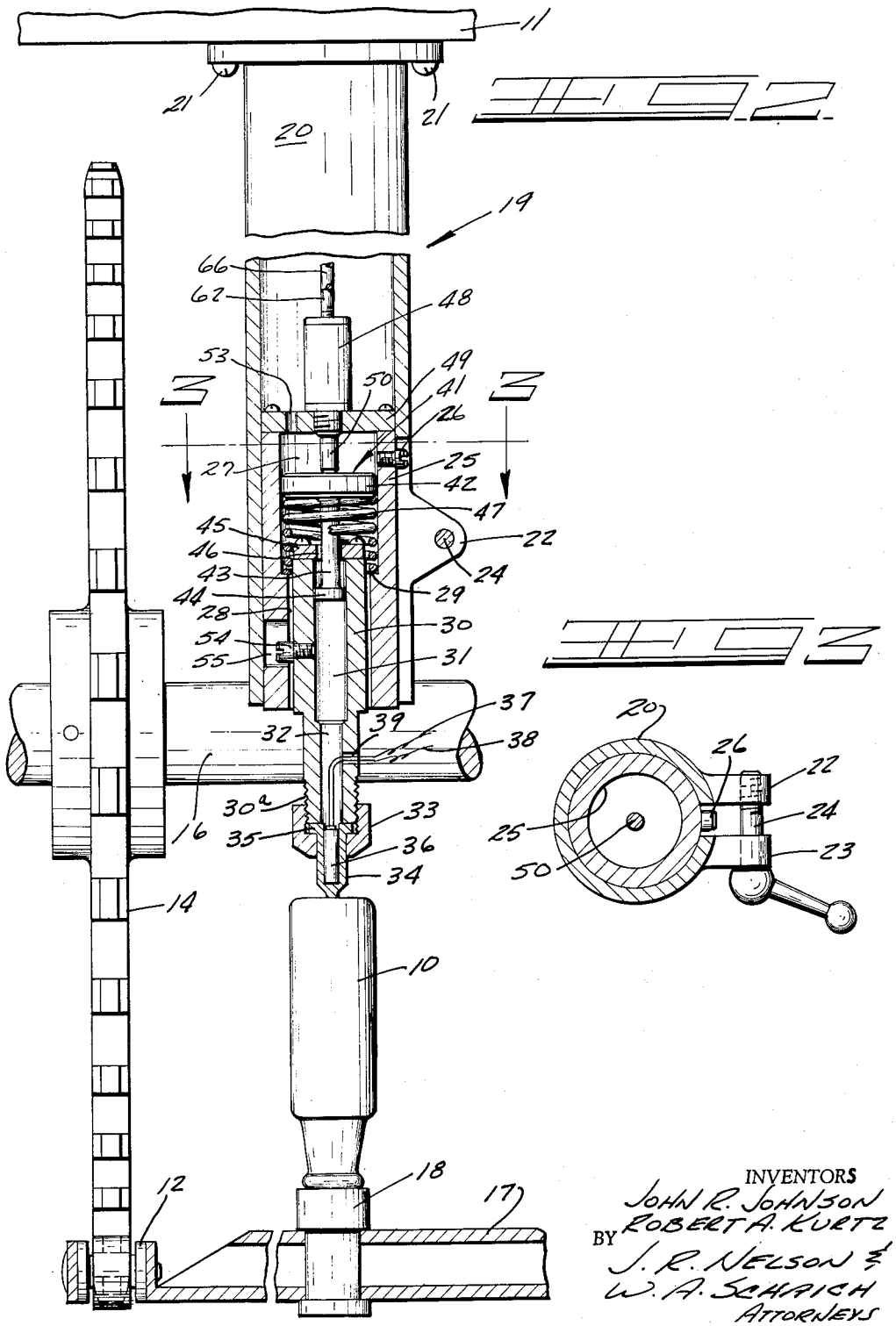
INVENTORS
JOHN R. JOHNSON
ROBERT A. KURTZ
BY
J. R. NELSON &
W. A. SCHAICH
ATTORNEYS United States Patent Office 3,025,786
Patented Mar. 20, 1962

3,025,786
DEVICE FOR MARKING CONTAINERS
John R. Johnson and Robert A. Kurtz, Toledo, Ohio, assignors to Owens-Illinois Glass Company, a corporation of Ohio
Filed Oct. 26, 1959, Ser. No. 848,584
4 Claims. (Cl. 101—44)

The present invention relates to a mechanism for marking articles, such as plastic coated glass containers, with an identifying mark, trademark, or other indicia; and, more particularly, to a mechanism useable with a machine for coating articles where the mark is formed by a heated die which contacts the coating while the article is moving on the machine.

An object of the invention is to provide a novel marking mechanism useable with a continuous article coating machine for producing a coating on fragile articles, such as glass containers, during continuous movement on a carriage through the machine, and applying a mark to the coating while the articles are moving.

Another object of the invention is to provide a marking mechanism wherein the marking is provided by a heated free falling die bearing the desired mark to produce a clear impression thereof on the coated surface of fragile articles without damaging the articles; and, as between successive articles, apply the marks uniformly thereto.

Another object of the invention is the provision of a marking mechanism that is simple and economical to operate, is fully automatic, and is adjustable for use in producing different marks and on various sizes and shapes of coated articles.

Other objects and advantages will become apparent from the following description, taken in conjunction with the annexed sheets of drawings, on which, by way of a preferred example, is illustrated one form of the invention as a practical adaptation thereof.

On the drawings:

FIG. 1 is a side elevational view of a portion of a coating machine showing coated containers being brought by a carriage past a marking station whereat the marking mechanism of the present invention is employed to mark the containers successively at their bottom surface.

FIG. 2 is a sectional elevational view, taken along line 2—2 of FIG. 1, showing the details of construction of the marking mechanism.

FIG. 3 is a sectional plan view taken along line 3—3 of FIG. 2.

FIG. 4 is a schematic diagrammatic view showing the controls for automatically operating the marking mechanism in time with the succession of moving articles on the carriage, thereby marking each container as it is brought through the marking station.

By its nature of use, the present invention utilizes a carriage which holds the articles to be marked in a spaced-apart relationship and moves them in a path through a marking station. The marking mechanism is mounted overhead by its frame, which carries a die holder and marking die. The die is provided with a heater which may be regulated to provide the desired heat to it to maintain a predetermined die-operating temperature which will be dependent on the material being marked thereby. The holder and die comprise a freely falling body having a determinate mass that is reciprocated toward and away from the articles at the marking station to provide the marking impression by contact of the die on the article during falling movement. The distance of this falling movement and the mass of the falling body may be determined to provide the desired marking force to be supplied by impact of the die on the article surface. The temperature of the die is another regulable factor in the application of the mark. With these variables set to produce a satisfactory marking, the markings obtainable on successive articles will be uniform. The reciprocating movement of the mass, that is, the holder and the die, is effected by a reciprocating motor having a piston rod connected to the holder by a lost-motion connection which is effective for raising the mass to its raised position so that the die is spaced vertically from the article and releases the mass for a free fall to mark the article at the marking station. The motor is operated by a control means that will provide one reciprocating cycle for each article moved through the marking station.

Referring to FIG. 1, a portion of a machine for producing plastic coatings on glass articles, such as the plastisol coated glass bottles 10, is shown, and includes structural members 11 of the machine frame and a moving component of a carriage comprised of parallel, spaced-apart, endless reaches of similar chains 12. The path of the carriage chains is defined by the running engagement of chains 12 about plural pairs of sprockets rotatably mounted on transverse shafts, and including sprockets 13 and 14 keyed on their respective journal-bearing mounted shafts 15 and 16. One of the shafts of the machine is motor driven (not shown) to provide continuous movement to the chains 12 in one direction. This movement is toward the left, as indicated by the arrows on sprockets 13 and 14 on FIG. 1. A plurality of equally spaced-apart cross pieces 17 are each end-connected between links of the chains 12 and extend transversely therebetween in parallel relationship one to the other. Article holding means in the form of chucks 18 are mounted on the cross pieces 17, and the articles 10 are each held by a chuck 18 to depend perpendicular from the cross pieces. A marking mechanism, indicated generally at 19, is fastened to the structural member 11 to depend vertically over the articles being moved along the underside of sprockets 14. Thus, the chains 12, cross pieces 17, and chucks 18 constitute a carriage for moving the articles 10 through a marking station under the marking mechanism 19, to be presently described.

Referring now to FIG. 2, the marking mechanism comprises a tubular column 20 that is attached at a fixed elevation, such as by bolts 21 on the overhead structural member 11. The lower part of column 20 is split (see FIG. 3) and provided with opposed lugs 22 and 23. Lug 22 has female threads that align with the bore through lug 23. A clamp 24 fits through lug 23 and has male threads that match the threads of lug 22. Thus, lever 24 may be used to enlarge or contract the split portion of column 20. A hollow sleeve 25 is insertable in the lower end of column 20 and may be fastened rigidly at the proper elevation by tightening clamps 24. This will provide adjustment for obtaining the proper vertical operating position for the mechanism and adapt it for use with a variation in sizes of articles 10. Column 20 and sleeve 25, with the latter fastened in place, combine to provide a frame of the marking mechanism. A driver screw 26 in sleeve 25 projects into the split portion of the column 20 to retain the sleeve in proper position and orient it upon assembly.

The central bore of sleeve 25 is graduated and provides an upper cylinder 27 and a lower cylinder 28. The juncture of these cylinders forms an annular shoulder 29. The die holder 30 fits loosely in the lower cylinder 28 so that it may move freely in an axial direction with respect to the sleeve 25 and may move a limited amount in a radial direction. This provides for free vertical movement and limited horizontal movement of the holder on the frame. The holder 30 has a counterbored central passage 31 and a concentric smaller central bore 32. The lower end of holder 30 is threaded at 30a to fasten a threaded die collar 33. The die 34 has a retaining flange 35 made to fit in collar 33 to retain the die in alignment upon tightening the collar 33 on the holder threads. The center of die 34 is bored to receive a cylindrical electrical heater element 36. A commercially available cartridge heater may be used for this element 36. The heater 36 has lead wires 37 and 38 which are received through an opening 39 of the holder 30 and connected into a power circuit having a variable voltage control, indicated at 40 on FIG. 4. This control 40 is connected to a source of voltage indicated at lines $a$ and $b$, and regulates the current supplied to the heater to provide a regulated heat to the die for maintaining it at the desired temperature.

It has been found in marking containers coated with a plastisol material that the die may be maintained in the temperature range of 200° F. to 300° F. to provide satisfactory markings on that type of a coating. Of course, with variations in the material being marked, the temperature range best suited may vary outside the temperatures just mentioned. Coupled with the effect that temperature of the die may have on the marking is the force provided by the die at its impact with the container surface. Since the die is driven by gravity, the force is measured by the velocity attained in the free fall of the mass represented by holder 30, die head 34, adapter screw 33, and cartridge heater 36.

Referring again to FIG, 3, the holder 30 reciprocated by the combination of a lost-motion linkage and a reciprocating motor. The mentioned linkage includes a floating link 41 comprised of a slide 42 which fits the upper cylinder 27 of the sleeve for axial movement therein, and an integral shaft 43 having an enlarged terminal end 44. The enlarged end 44 is fitted to slide in the central passage 31 of holder 30. A retaining collar 45 is bolted over the upper end of the holder and has an opening 46 of a size large enough to receive the shaft 43 of the floating link, yet small enough to retain the enlarged end 44 within the passage 31. A coil spring 47 is compressed between the lower side of the slide 42 and the shoulder 29 of the sleeve 25. The spring 47 thus acts to normally force the link 41 upwardly to engage the enlarged end 44 with the underside of the retaining collar 45. Up to this point of engagement, relative movement is permitted between the link 41 and the holder 30. Thereafter, the parts 41 and 30 move together in this direction. A fluid-operated, reciprocating motor 48 is mounted by threads in an upper cap 49 on the sleeve 25. The piston rod 50 of motor 48 depends below the cap 49 to be engageable with the upper surface of the slide 42. The motor 48, as shown, is preferably, for the sake of simplicity of design, a single acting air cylinder which is connected at line 62 to receive fluid under pressure, and has a line 66 connected to the cylinder to exhaust fluid therefrom. An exhaust passage 53 is provided in the cap 49 to exhaust air from within the cylinder 27. Thus, as the piston of motor 48 is permitted to move upwardly, the coil spring 47 will drive the link 41 and the piston rod 50 in the upward direction. As stated, after the link has moved sufficiently in that direction to engage the enlarged end 44 with the cap 45 of the holder, the holder 30 will be picked up and moved to a raised position. The limit of the raised position always remains constant by having a driver screw 54 fastened in the side of holder 30 retained in the vertical slot 55 at the side of holder 30.

With the holder and die being retained in the raised position, as just described, the die is operated for marking a container by reversing the connection to the motor 48 so as to drive the piston rod 50 downwardly. Thusly, the motor 48 will force the link 41 to move freely and relatively with respect to the holder 30 in its passage 31, while compressing the spring 47. The motor will provide this actuation rapidly, and the holder 30 and its die 34 will be permitted a free fall. The sleeve 25 is fastened to an adjusted operating height within the column 20 to suit the particular container 10 that is being marked, so that the free fall will cause the die 34 to engage the container surface and mark it. However, should no container be present on the chuck 18 as it is presented at the marking station, the holder 30 will be stopped in its fall at the lower limit defined by the screw 54 engaging the bottom of the slot 55.

Referring now to FIG. 4, the automatic control for operating the die through its reciprocating cycle in marking articles successively will be explained. The control means utilized for this purpose comprises a solenoid-operated valve 60 for controlling the motor 48. The valve has an inlet port 61 connected to a source of fluid under pressure, and an outlet port 62 connected to the cylinder of motor 48. The valve stem is normally set by a spring 63 to block the connection between the ports 61 and 62 by its land 64 covering those ports within the valve body. This setting will have the righthand land 65 of the valve stem bear against the righthand side of the valve body and connect an exhaust port 66 from the cylinder of motor 48 to the valve with the opposite exhaust port 67 leading from the valve. In this setting, the solenoid 68 of the valve 60 is deenergized so that the valve stem is solely under the control of the valve spring 63. As is depicted schematically on FIG. 4, for simplicity of illustration only, the function served by the spring 47 in lifting the link 41 is shown to also serve to drive the piston 48a of the motor in an upward direction, plus moving the holder 30 and its die 34 to raised position, as previously described. The solenoid 68 is energized to shift the stem of valve 60 and reverse the direction of movement of the piston 48a of the motor by a control means that is intermittently operable for energizing the solenoid for a predetermined time. This control comprises a circuit made up of wires 70 and 71 connected respectively across mains $a$ and $b$ of the voltage source, the wire 70 being connected to one terminal of an automatic reset-type timer 72. The wire 71 is connected across the contacts of a limit switch 73 and to the other terminal of the timer 72. One such timer, as indicated at 72, is commercially available as an ATC electronic dial timer series having dual timing ranges of 0.02–1.0 seconds and 0.2–10.0 seconds, and operable on 115 volt, 60 cycle, A.C. current. Under the present invention, the timer is preferably operated on the 0.02–1.0 second range. The actuator 73a of switch 73 is normally set by a spring 73b to open the circuit of line 71 across the contacts of switch 73 and retain the timer deenergized. As shown on FIG. 1, the switch 73 is mounted on an angle bracket 74 attached to the frame 11 so that the actuator 73a and the switch will lie in the path of the article holding means and the cross bars 17 of the machine carriage. As was previously described, these cross bars are equally spaced along the chain 12. As the cross bars 17 move past the stationary actuator 73a of the switch, they will engage the actuator and close the switch in the manner shown on FIG. 4. This will energize the timer 72 to immediately start a predetermined period of energization of the solenoid 68 of the valve.

Thus, while the solenoid 68 is energized for the fraction of a second, the valve stem of the valve 60 is actuated against its spring 63 so that the land 65 blocks the exhaust ports 66, 67. Land 64 is moved to connect pressure ports 61, 62 to reverse the piston 48a of the motor momentarily and actuate the link 41 through its lost motion action and release the holder and its die for the free fall to mark the article 10 present at the marking station. After the time period set on the timer has elapsed, the timer 72 deenergizes solenoid 68 and resets itself automatically, regardless of whether switch 73 is open or closed. After solenoid 68 is deenergized, the valve 60 shifts back to its normal setting to effect moving the die to the raised position in the manner previously described. The reciprocating cycle is successively repeated responsive to the movement of the carriage.

Various modifications may be resorted to within the spirit and scope of the appended claims.

We claim:
1. An apparatus for marking articles, such as containers of the class described, comprising a carriage having article holding means thereon in spaced relation by which the articles are held for moving them in a path through a marking station, a marking device at said station comprising an overhead frame, a die holder carried by said frame and movable axially and horizontally with respect thereo, said holder having an axial passage, a marking die fastened at the outer end of the holder, a heater in contact with the die for heating it to maintain a predetermined temperature, a link having a slide at one end adapted for axial movement and an integral shaft which terminates at an enlarged end, said enlarged end adapted to fit in said passage for movement therein, a cover member fastened on said holder to receive said shaft and retain its enlarged end within the passage a coil spring supported by the frame and compressed against said slide of the link to normally force the latter upwardly, a reciprocating fluid-operated cylinder-piston motor mounted on the frame and including a piston rod engageable with the slide, a source of fluid under pressure connected to the motor cylinder, a solenoid-operated valve interposed between said source and said cylinder to control the movement of the motor piston, said valve being normally set for moving said piston upwardly, and means intermittently operable for a predetermined timed interval to energize the solenoid and shift the valve to reverse the piston, said means being operated by the article holding means responsive to movement of the carriage.

2. An apparatus for marking articles, such as containers of the class described, comprising a carriage having article holding means thereon in spaced relation by which the articles are held for moving them in a path through a marking station, a marking device at said station comprising an overhead column, a hollow sleeve slidable vertically on said column, means for fastening the sleeve at an adjusted vertical position on the column, a die holder carried by said sleeve and movable axially and radially with respect thereto, said holder having an axial passage, a marking die fastened at the outer end of the holder, a heater in contact with the die for heating it to maintain a predetermined temperature, a link having a slide at one end fitting in said sleeve for axial movement and an integral shaft which terminates at an enlarged end, said enlarged end adapted to fit in said passage for movement therein, a cover member fastened on said holder to receive said shaft and retain its enlarged end within the passage, a coil spring retained by the sleeve and compressed against said slide of the link to normally force the latter upwardly, a reciprocating fluid-operated cylinder-piston carried by the column and including a piston rod extending into the sleeve engaging the slide, a source of fluid under pressure connected to the motor cylinder, a solenoid-operated valve interposed between said source and said cylinder to control the movement of the motor piston, said valve being normally set for moving the piston upwardly, a power circuit for energizing the solenoid and shifting the valve to reverse the piston, an automatic timer control in the power circuit operable for energizing the solenoid a predetermined time, and a normally open switch that is closed by an article holding means as each said article is moved by the carriage through the marking station, said switch operating said timer control.

3. In a machine for coating articles with a plastic material to produce containers of the class described, said machine including a moving carriage having article holding means thereon in spaced relation by which the articles are held during treatment in producing the coating thereon, and which moves the coated articles in a straight path through a marking station, the combination therewith of a mechanism for marking the coated articles at said station, comprising a marking die, means for heating said die to maintain it at a temperature compatible with marking said coating, a frame supported at said station, a reciprocating motor carried on said frame, including a piston rod, means operatively connecting the piston rod and said die for moving the latter to a raised position out of contact with the coating on an article present at said station, comprising a holder having said die attached to one end and mounted on the frame for free vertical movement and limited horizontal movement, a floating link having one end connected to the holder in a manner to permit limited relative movement therebetween and the other end engageable with the piston rod, and a spring compressed between said link and the frame for forcing the link in a direction to raise the die under control of a piston rod, the link being moved under force of the piston rod in the opposite direction and relative to the holder to permit the die to fall by gravity, and control means for reciprocally operating the motor for moving the piston rod in opposite directions to effect (1) raising the die and (2) releasing the die to permit the latter to fall by gravity for contacting a coated article at the marking station.

4. In a machine for coating articles with a plastic material, said machine including a moving carriage having article holding means thereon in longitudinally spaced relation by which the coated articles are moved and passed through a marking station, mechanism for marking the coated articles at said station comprising a supporting frame at said station, a marking die shiftable reciprocably on said frame and connected thereto to permit limited movement of the die in a direction along said path, a reciprocal cylinder piston motor on said frame including a piston rod, a lost-motion linkage engageable with the piston rod and yieldingly connected to said die, resilient means connected to said linkage normally biasing said piston rod and urging said linkage toward raising said die, said lost-motion linkage being controlled by the piston rod in relation to said die for moving the latter to raised position whereat it is spaced vertically with respect to said articles on the carriage and lowering it for releasing said die thereby permitting it to fall by gravity, a source of fluid under pressure operably connected to the motor cylinder, a solenoid operated valve interposed between said source and said cylinder to control movement of the motor piston, said valve being normally set for moving said linkage to raised position, an electrical source, and a timed control means operated responsive to movement of articles through the marking station for intermittently energizing the solenoid by said electrical source for a preselected time interval to actuate said piston rod and drive said linkage permitting a gravity fall of the die from its raised position into contact with the coated article at the coating station.

References Cited in the file of this patent

UNITED STATES PATENTS

| | | |
|---|---|---|
| 2,120,679 | Pohle | June 14, 1938 |
| 2,427,358 | Kovach | Sept. 16, 1947 |
| 2,489,229 | Steckley | Nov. 22, 1949 |
| 2,559,455 | Meyer | July 3, 1951 |
| 2,819,671 | Porter et al. | Jan. 14, 1958 |